United States Patent
Sarafin et al.

(10) Patent No.: US 11,050,333 B2
(45) Date of Patent: Jun. 29, 2021

(54) TORQUE MOTOR ASSEMBLY

(71) Applicant: Hamilton Sundstrand Corporation, Charlotte, NC (US)

(72) Inventors: Jakub Sarafin, Wroclaw (PL); Michał Zgorecki, Grodków (PL)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/516,935

(22) Filed: Jul. 19, 2019

(65) Prior Publication Data
US 2020/0169153 A1    May 28, 2020

(30) Foreign Application Priority Data
Nov. 27, 2018   (EP) .................................. 18461631

(51) Int. Cl.
F16K 31/04     (2006.01)
H02K 26/00     (2006.01)

(52) U.S. Cl.
CPC .......... *H02K 26/00* (2013.01); *F16K 31/042* (2013.01)

(58) Field of Classification Search
CPC ......... Y10T 137/86598; F15B 13/0438; F16K 31/0627; H02K 1/12; H02K 1/22; H01F 7/0623; H01F 7/1653; H01F 2007/086; H01F 7/081; H01F 7/085; H01F 7/086; H01F 2007/1661
USPC ........................ 251/129.1; 335/261, 279, 281
See application file for complete search history.

(56) References Cited

U.S. PATENT DOCUMENTS

| | | | | |
|---|---|---|---|---|
| 2,407,603 | A | * | 9/1946 | Derungs ................ H01F 7/13 361/206 |
| 2,407,963 | A | * | 9/1946 | Persons ................ H01F 7/13 335/261 |
| 3,168,242 | A | * | 2/1965 | Diener ............... G05D 23/1906 236/75 |
| 3,437,101 | A | | 4/1969 | Coakley et al. |
| 3,447,111 | A | | 5/1969 | Coakley et al. |
| 3,542,051 | A | | 11/1970 | McFadden et al. |
| 3,858,135 | A | | 12/1974 | Gray |
| 4,046,061 | A | | 9/1977 | Stokes |
| 5,473,298 | A | | 12/1995 | Teutsch |
| 5,814,907 | A | | 9/1998 | Bandera |
| 6,786,238 | B2 | | 9/2004 | Frisch |
| 9,309,900 | B2 | | 4/2016 | Kopp |

(Continued)

FOREIGN PATENT DOCUMENTS

| | | |
|---|---|---|
| EP | 2922071 A1 | 9/2015 |
| EP | 3321513 A1 | 5/2018 |
| GB | 2104249 A | 3/1983 |

OTHER PUBLICATIONS

Extended European Search Report for International Application No. 18461631.6 dated May 24, 2019, 6 pages.

*Primary Examiner* — Seth W. Mackay-Smith
(74) *Attorney, Agent, or Firm* — Cantor Colburn LLP

(57) ABSTRACT

A torque motor assembly comprising two or more pole piece pairs, each pair comprising two opposing pole pieces each having an end facing an end of the opposite pole piece, the ends separated by a gap; and a magnetic plate extending between the pole piece pairs and located in the gap, the magnetic plate having surface portions facing the respective pole piece ends; wherein the surface portions of the magnetic plate and the respective pole piece ends are non-parallel with respect to each other.

4 Claims, 3 Drawing Sheets

(56) References Cited

U.S. PATENT DOCUMENTS

| | | | |
|---|---|---|---|
| 9,347,579 B2* | 5/2016 | Gieras | F16K 31/0655 |
| 9,709,177 B2* | 7/2017 | Futa | F16K 11/052 |
| 9,721,713 B2* | 8/2017 | Becker | F16D 27/112 |
| 9,897,116 B2* | 2/2018 | Ozzello | H02K 11/20 |
| 9,960,648 B2 | 5/2018 | Tutunaru | |
| 2005/0189512 A1* | 9/2005 | Kaneko | F02M 63/0015 |
| | | | 251/129.16 |
| 2013/0087223 A1* | 4/2013 | Ozzello | F15B 13/0436 |
| | | | 137/551 |
| 2015/0047729 A1 | 2/2015 | Kopp et al. | |
| 2015/0097130 A1* | 4/2015 | Gieras | F16K 31/0658 |
| | | | 251/129.19 |

* cited by examiner

TORQUE MOTOR ASSEMBLY

FOREIGN PRIORITY

This application claims priority to European Patent Application No. 18461631.6 filed Nov. 27, 2018, the entire contents of which is incorporated herein by reference.

TECHNICAL FIELD

The present disclosure relates to torque motor assemblies, particularly as used to control displacement of an armature in servo valves used to transfer quantities of, or manage the flow of fluid e.g. air.

BACKGROUND

Torque motors are usually used to drive servo valves. Servo valves find a wide range of applications for controlling air or other fluid flow to effect driving or control of another part e.g. an actuator.

A servo valve assembly includes a drive assembly e.g. a torque motor controlled by a control current which controls flow to a valve e.g. an air valve to control an actuator. Generally, a servo valve transforms an input control signal into movement of an actuator. The actuator controls e.g. an air valve. In other words, a servo valve acts as a controller, which commands the actuator, which changes the position of an air valve's flow modulating feature.

Such mechanisms are used, for example, in various parts of aircraft where the management of fluid/air flow is required, such as in engine bleeding systems, anti-ice systems, air conditioning systems and cabin pressure systems. Servo valves are widely used to control the flow and pressure of pneumatic and hydraulic fluids to an actuator, and in applications where accurate position or flow rate control is required. Some examples of applications are aircraft, automotive systems and in the space industry.

Conventionally, servo valve systems operate by obtaining pressurised fluid from a high pressure source which is transmitted through a load from which the fluid is output as a control fluid. Various types of servo valves are known—see e.g. GB 2104249, US 2015/0047729 and U.S. Pat. No. 9,309,900.

Electrohydraulic servo valves can have a first stage with a motor, e.g. an electrical or electromagnetic force motor or torque motor, controlling flow of a hydraulic fluid to drive a valve member e.g. a spool valve of a second stage, which, in turn, can control flow of hydraulic fluid to an actuator for driving a load. The motor can operate to position a moveable member, such as a flapper, in response to an input drive signal or control current, to drive the second stage valve member e.g. a spool valve.

Such conventional systems will be described in more detail below.

Particularly in aircraft applications, but also in other applications, servo valves are often required to operate at various pressures and temperatures. For e.g. fast acting air valve actuators, relatively large flows are required depending on the size of the actuator and the valve slew rate. For such high flow rates, however, large valve orifice areas are required. For 'flapper' type servo valves, problems arise when dealing with large flows due to the fact that flow force acts in the direction of the flapper movement and the motor is forced to overcome the flow forces. For clevis-like metering valves such as described in U.S. Pat. Nos. 4,046,061 and 6,786,238, the flow forces, proportional to the flow, act simultaneously in opposite directions so that the clevis is balanced and centered. The clevis, however, needs to be big due to the requirement for bigger orifices to handle larger flows.

Jet pipe servo valves provide an alternative to 'flapper'—type servo valves. Jet pipe servo valves are usually larger than flapper type servo valves but are less sensitive to contamination. In jet pipe systems, fluid is provided via a jet pipe to a nozzle which directs a stream of fluid at a receiver. When the nozzle is centered—i.e. no current from the motor causes it to turn, the receiver is hit by the stream of fluid from the nozzle at the centre so that the fluid is directed to both ends of the spool equally. If the motor causes the nozzle to turn, the stream of fluid from the nozzle impinges more on one side of the receiver and thus on one side of the spool more than the other causing the spool to shift. The spool shifts until the spring force of a feedback spring produces a torque equal to the motor torque. At this point, the nozzle is centred again, pressure is equal on both sides of the receiver and the spool is held in the centered position. A change in motor current moves the spool to a new position corresponding to the applied current.

As mentioned above, jet pipe servo valves are advantageous in that they are less sensitive to contamination e.g. in the supply fluid or from the valve environment. These valves are, however, more complex and bulkier. Additional joints are required for the fluid supply pipe, and the supply pipe from the fluid supply to the jet pipe is mounted outside of the servo valve body in the torque motor chamber. In the event of damage to the pipe, this can result in external leakage. The pipe, being external, adds to the overall size and is more vulnerable to damage.

European Patent Application 16461572 teaches a jet-pipe type servo valve wherein fluid is provided to the nozzle via a connector header in fluid communication with the interior of the spool, the spool being provided with one or more openings via which fluid from the supply port enters the interior of the spool and flows into the connector header and to the nozzle.

The servo valve includes drive means for steering the nozzle in response to the control signal. The drive means may include a motor such as a torque motor arranged to steer the nozzle by means of an induced current. Other drive means may be used to vary the position of the nozzle. The drive means may be mounted in a housing attached to the valve assembly.

The arrangement of EP 16461572 enables the conventional outside supply pipe to be removed and allows the jet pipe to be fed with fluid via the spool and a feedback spring.

Fluid flow can also be provided using a single stage flapper-nozzle type valve assembly as shown in FIG. 1 and described below. This may be used to drive a two stage servovalve as described above.

Conventional servo valves, as mentioned above, are driven by a torque motor subassembly to take up a spool position responsive to a control signal. Such torque motor assemblies generally comprise opposing pole pieces between which is located a magnetic plate which is part of the armature. The force from the torque motor is transferred via the pole pieces to move the magnetic plate which moves the flapper or jet pipe to correspondingly move the spool.

The most efficient configuration, in terms of force transfer, has pole pieces with flat surfaces facing the flat magnetic plate. Other complementary shapes have also been considered. The matching of the pole piece surfaces to the magnetic plate surfaces, however, can give rise to a phenomenon known as 'latching'. Latching occurs when the magnetic plate gets too close to a pole piece, due to the motor force. The pulling force of the pole piece on the magnetic plate can then start to exceed the net spring force produced as a result of a mechanical spring in the armature and the magnetic stiffness of the torque motor and so the magnetic plate latches onto the pole piece. When this happens, excessive force has to be used to disconnect the plate from the pole piece e.g. by providing a large current of opposite polarity or some external force. Sometimes, this force can be so great that it causes the magnetic plate to be pushed to and latch to the opposite pole piece.

There is, therefore, a need for an improved torque motor assembly which prevents latching or at least reduces the amount of force necessary to disconnect components should latching occur.

DETAILED DESCRIPTION

A torque motor assembly as described below can be used as a drive assembly of a servo valve to control a flow of fluid that is output to control the movement of an actuator. The actuator can control e.g. ailerons or elevator flaps of an aircraft.

Figure 1:
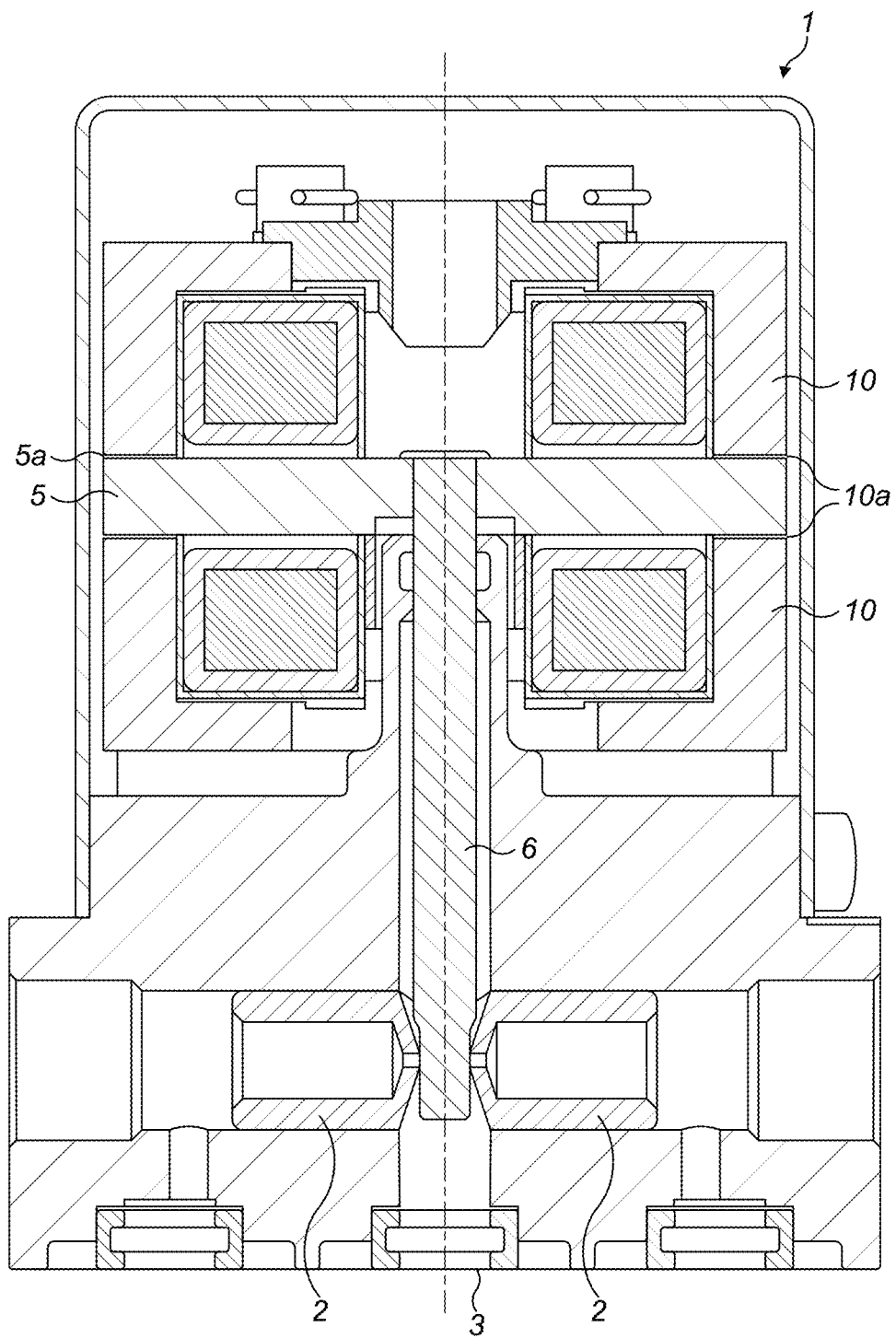
FIG. 1 is a schematic view of a conventional torque motor assembly in a servo valve.

A typical flapper-nozzle type servo valve is shown in FIG. 1. The assembly shown comprises a single stage valve assembly.

The toque motor 1 causes the flapper 6 to move to the right/left responsive to a control signal. The flapper 6 thus moves between two axially opposing nozzles 2, which, in turn, changes the flow output/pressure at the control part 3.

The control signal is applied to the torque motor and armature which causes the flapper-type drive member 6 to deflect left or right. The single stage assembly can be used as a drive stage for a spool valve assembly. Therefore, when the control signal is such as to cause the drive stage to apply greater fluid pressure to one end of the spool, by diverting more fluid to that end, the spool will move away from that end and vice versa.

In more detail, in the conventional assemblies, to open the servo valve, control current is provided to coils of the motor (e.g. a torque motor) creating electromagnetic torque opposing the sum of mechanical and magnetic torque already 'present' in the torque motor. The bigger the electromagnetic force from the coils, the more the jet pipe nozzle turns or the flapper pivots. A torque motor usually consists of coil windings, a ferromagnetic armature, permanent magnets and a mechanical spring (e.g. two torsional bridge shafts). This arrangement provides movement of the nozzle/flapper proportional to the input control current.

The torque motor assembly comprises pairs of opposing pole plates 10 between which is located a magnetic plate 5 connected to the drive member (e.g. flapper 6). The faces 10a of the pole pieces 10 are flat to match the opposing face 5a of the magnetic plate 5 as this provides the most force efficient configuration.

As mentioned above, though, this can give rise to latching.

The torque motor assembly according to this disclosure operates in a manner similar to the above-described conventional assemblies, but the faces of the pole pieces and/or the magnetic plate are not flat or precisely form fitting—rather they are shaped such that there is a difference in the angle of the pole piece face and the angle of the corresponding magnetic plate surface—i.e. that the adjacent surfaces of the pole pieces and the magnetic plate are not exactly form-fitting.

Examples are shown in FIGS. 2A, 2B, 3A and 3B.

Figure 2A:
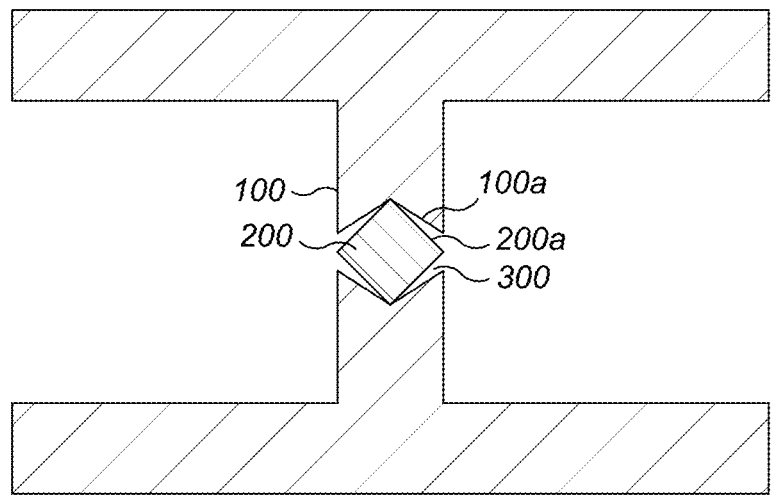
FIG. 2A is a cross-sectional view of a torque motor assembly according to an embodiment of the disclosure.
Figure 2B:
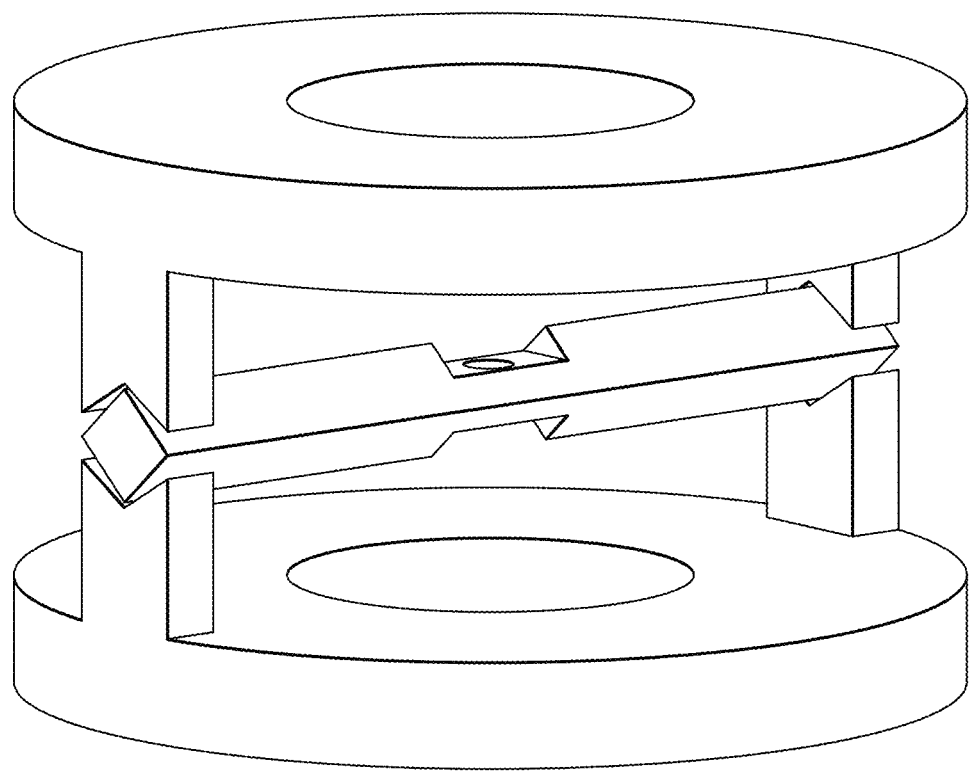
FIG. 2B is a perspective view of the embodiment of FIG. 2A.

FIGS. 2A and 2B show, from different perspectives, an embodiment in which the surfaces 100a of the pole pieces 100 have a triangular shape. The magnetic plate 200 is also formed with a triangular cross section but having angles differing from the angles of the triangles of the pole pieces such that there is a small gap 300 between the pole pieces and the plate at some areas of the interface, rather than the magnetic plate directly contacting the pole pieces all along the interface when latching takes place.

Figure 3A:
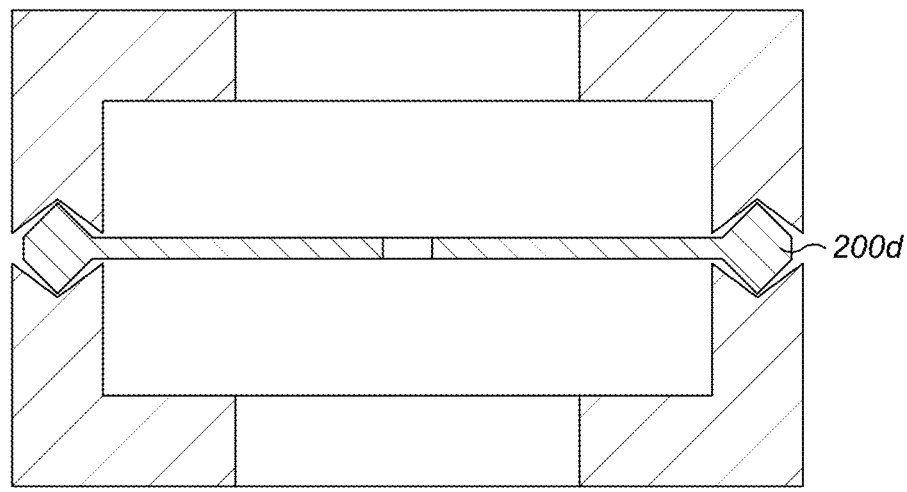
FIG. 3A is a cross-sectional view of a torque motor assembly according to another embodiment of the disclosure.
Figure 3B:
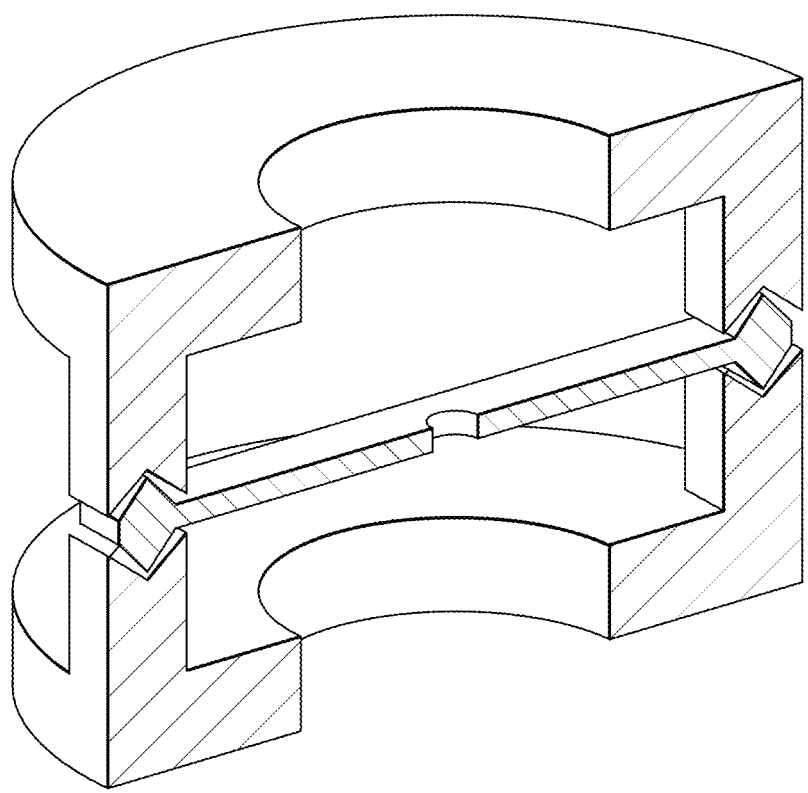
FIG. 3B is a perspective view of the embodiment of FIG. 3A.

FIGS. 3A and 3B show an alternative configuration in which the magnetic plate has a conical cross-section with the pointed ends being received in a triangular indentation of the pole pieces but with the sloping surfaces of the magnetic plate having a different angle to the sloping surfaces of the pole pieces, again leaving a gap where the interfacing parts do not precisely match when latching takes place.

Such a geometry at the interface between the pole pieces and the magnetic plate mean that there is an increased surface area over which the magnetic field flows, but that because the respective angles differ and the surfaces are not parallel to each other, efficiency is reduced. The higher efficiency provided by the greater surface area may balance out the reduction in efficiency due to the non-parallel surfaces, but this will depend on the selected angles and overall dimensions. Although there may be an overall drop in efficiency of the system, this is offset by the fact that the different angles means that the actual possible contact area is reduced which reduces the possibility of latching. Even if latching does occur, the force required to separate the pole pieces and the magnetic plate will be less than for parallel surfaces. This smaller force should be achieved by the torque motor without the need for additional external force.

Latching may be avoided by adding a 'hard stop' to the design such as a screw protruding from the pole piece surface, although this will require further modification of the surface and, further, will reduce the efficiency of the torque motor. Another way to reduce the possibility of latching is to provide an increased gap between the pole pieces, although this requires the Permanent Magnets to be sized differently, and possibly even selection of a different, more powerful magnet material, which in turn requires a different coil design (number of coil windings, coil resistance, impedance etc.) not discussed further here.

The rest of the operation of the servo valve and spool assembly is analogous to that of the flapper and jet-pipe arrangements and will not be described in detail.

Although this disclosure has been described in terms of preferred examples, it should be understood that these examples are illustrative only and modifications and alterations are possible within the scope of the claims.

The invention claimed is:

1. A torque motor assembly comprising:
   two or more pole piece pairs, each pair comprising two opposing pole pieces each having an end facing a respective end of the opposite pole piece, the ends separated by a gap, each pole piece defining a pole piece surface; and
   a magnetic plate extending between the pole piece pairs and located in the gap, the magnetic plate having surface portions that define planes and that are facing the respective pole piece ends; wherein
   the planes defined by the surface portions of the magnetic plate are non-parallel to the pole piece surfaces;
   wherein each pole piece end has a triangular cross-section cut out such that opposing pole pieces define a diamond-shaped gap between them, and wherein the magnetic plate has a diamond-shaped cross-section defined by angles different from those defining the gap.

2. The torque motor assembly of claim 1, wherein the pole piece ends define one or more slopes and the surface portions of the magnetic plate define one or more slopes and the slopes of the pole piece ends have an angle different from that of the slopes of the magnetic plate surface portions.

3. A servo valve assembly comprising:
   a moveable member to control fluid flow; and
   a torque motor assembly as claimed in claim 1 configured to drive the moveable member in response to a control signal.

4. A torque motor assembly comprising:
   two or more pole piece pairs, each pair comprising two opposing pole pieces each having an end facing a respective end of the opposite pole piece, the ends separated by a gap, each pole piece defining a pole piece surface; and
   a magnetic plate extending between the pole piece pairs and located in the gap, the magnetic plate having surface portions that define planes and that are facing the respective pole piece ends; wherein
   the planes defined by the surface portions of the magnetic plate are non-parallel to the pole piece surfaces;
   wherein each pole piece end has a triangular cross-section cut out, and the ends are spaced apart such that opposing pole pieces define a hexagonal-shaped gap between them, and wherein the magnetic plate has a hexagonal-shaped cross-section defined by angles different from those defining the gap.

* * * * *